United States Patent
Khoury

(10) Patent No.: US 8,555,085 B2
(45) Date of Patent: Oct. 8, 2013

(54) ENHANCING USEABILITY OF MOBILE DEVICES THAT SECURELY STORE DATA

(75) Inventor: Paul El Khoury, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/416,938

(22) Filed: Mar. 9, 2012

(65) Prior Publication Data

US 2013/0238906 A1     Sep. 12, 2013

(51) Int. Cl.
   *G06F 21/00*     (2013.01)
(52) U.S. Cl.
   USPC .......................................... 713/189; 726/26
(58) Field of Classification Search
   USPC ......................... 726/26; 713/189, 187, 193
   See application file for complete search history.

(56) References Cited

U.S. PATENT DOCUMENTS

| | | |
|---|---|---|
| 2002/0172363 A1 | 11/2002 | Dierks et al. |
| 2003/0005019 A1* | 1/2003 | Pabla et al. ...................... 709/1 |
| 2009/0307657 A1 | 12/2009 | Farrugia et al. |
| 2011/0126273 A1 | 5/2011 | Bhatia et al. |

OTHER PUBLICATIONS

Communication from EPO Mailed May 7, 2013 re appl. No. 13000707.3-1957, including European Search Report, 8 pages.
AppleInc: iOS Application Programming Guide, 20110224, dated Feb. 24, 2011, pp. 1-114, XP007919143.

* cited by examiner

*Primary Examiner* — Edward Zee
(74) *Attorney, Agent, or Firm* — Fish & Richardson P.C.

(57) ABSTRACT

Methods, computer-readable media, and systems for enhancing useability of mobile devices that securely store data. An input to transfer a computer software application executing on a mobile device from a foreground state of the mobile device to a background state of the mobile device is received. In response, noise data based on application data associated with the application is generated. Both the application data and the noise data are encrypted using the same encryption mechanism, but using different keys. When another input to transfer the application from the background state to the foreground state is received, then the encryption mechanism is executed on the application data and the noise data using a key requested in response to the other input. The application is transferred to the foreground state if the received key matches the key with which the application data was previously encrypted. Other items of data are discarded.

24 Claims, 3 Drawing Sheets

ENHANCING USEABILITY OF MOBILE DEVICES THAT SECURELY STORE DATA

TECHNICAL FIELD

The present disclosure relates to software, computer systems, and computer-implemented methods that store data on mobile devices.

BACKGROUND

Computer systems, for example, desktop computers, personal digital assistants, laptop computers, tablet computers, and the like, are configured to implement computer software applications by executing computer program instructions to perform operations. Mobile computer systems, which are sometimes known as mobile devices, are portable versions of computer systems, and can also implement computer software applications, which, in some situations, are designed specifically for mobile devices. For example, many Internet publishers offer a version of an electronic mail (e-mail) application for computer systems, such as, desktop and laptop computer systems, and a counterpart version of the application for mobile devices.

Users of the mobile devices provide data to and receive data through computer software applications executing on the mobile devices. A mobile device, therefore, is often a repository of several items of data. Some of the items of data are associated with computer software applications, while others are associated with the mobile device itself. In some situations, a mobile device can be a database that stores data that is neither associated with a computer software application that the mobile device executes or with the device itself. Several facilities are available to securely store data on a system such as a computer system or a mobile device. For example, a data encrypting software application executing on a system can encrypt and decrypt data stored on the system. The software application, in some situations, can request an input from a user to either encrypt or decrypt data (or both).

Mobile devices are configured such that a user of a mobile device can execute multiple computer software applications simultaneously. To enhance device useability from a user's perspective, the device can allow the user to switch between the software applications with minimum effort. For example, the device can implement functionalities that allow a user to invoke one application (such as a map application) using a user interface provided by another application (for example, an Internet browser). While a mobile device can implement data encrypting software applications to encrypt/decrypt data that is associated with a computer software application that is executing on the device, a useability of the device may be affected, for example, if the user's effort to switch between applications is increased by a need to provide input to the data encrypting application.

SUMMARY

The present disclosure involves systems, software, and computer-implemented methods to enhancing useability of mobile devices that securely store data.

In general, one innovative aspect of the subject matter described here can be implemented as a computer-implemented method performed by data processing apparatus. A first input to transfer a computer software application executing on a mobile device from a foreground state of the mobile device to a background state of the mobile device is received. The computer software application is associated with application data. In response to receiving the first input, noise data based on the application data is generated. An encryption mechanism is executed on the application data using a first key resulting in a first authentication code associated with the application data. The encryption mechanism is executed on the noise data using a second key that is different from the first key resulting in a second authentication code associated with the noise data. Items of data including the application data, the noise data, and the first authentication code are stored.

This, and other aspects, can include one or more of the following features. A second input to transfer the computer software application from the background state to the foreground state can be received. In response to receiving the second input, a key can be requested and received, and the encryption mechanism can be executed on a stored item of data using the received key resulting in a code. If the key is the first key, then the code is the first authentication code. In response to executing the encryption mechanism on a stored item of data using the received key resulting in the code, it can be determined that the code is the first authentication code and that the stored item of data is the application data. The computer software application can be transferred from the background state to the foreground state. Remaining stored items of data other than the application data can be discarded. If the key is not the first key, then the code is not the first authentication code. In response to executing the encryption mechanism on a stored item of data using the received key resulting in the code, it can be determined that the code is not the first authentication code and that the stored item of data is not the application data. Access to the application data can be denied. Denying access to the application data can include providing an indication that the received key is incorrect, and the key can be requested again. The mobile device can be locked if the key received in response to the other request is not the first key. If the key is the first key, then the code is not the second authentication code. In response to executing the encryption mechanism on a stored item of data using the received key resulting in the code, it can be determined that the code is not the second authentication code and that the stored item of data is a noise data. In response to determining that the stored item of data is a noise data, the noise data can be hidden. Hiding the noise data can include deleting the noise data from the mobile device. Generating the noise data based on the application data can include generating a copy of the application data, and modifying the copy of the application data to generate the noise data. The encryption mechanism can include a hash function. The computer software application can present a user interface when executing in the foreground state. The computer software application can hide the user interface from display when executing in the background state.

Another innovative aspect of the subject matter described here can be implemented as a non-transitory computer-readable medium tangibly encoding computer program instructions executable by data processing apparatus to perform operations described here. A further innovative aspect of the subject matter described here can be implemented as data processing apparatus, and a non-transitory computer-readable medium tangibly encoding computer program instructions executable by the data processing apparatus to perform operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
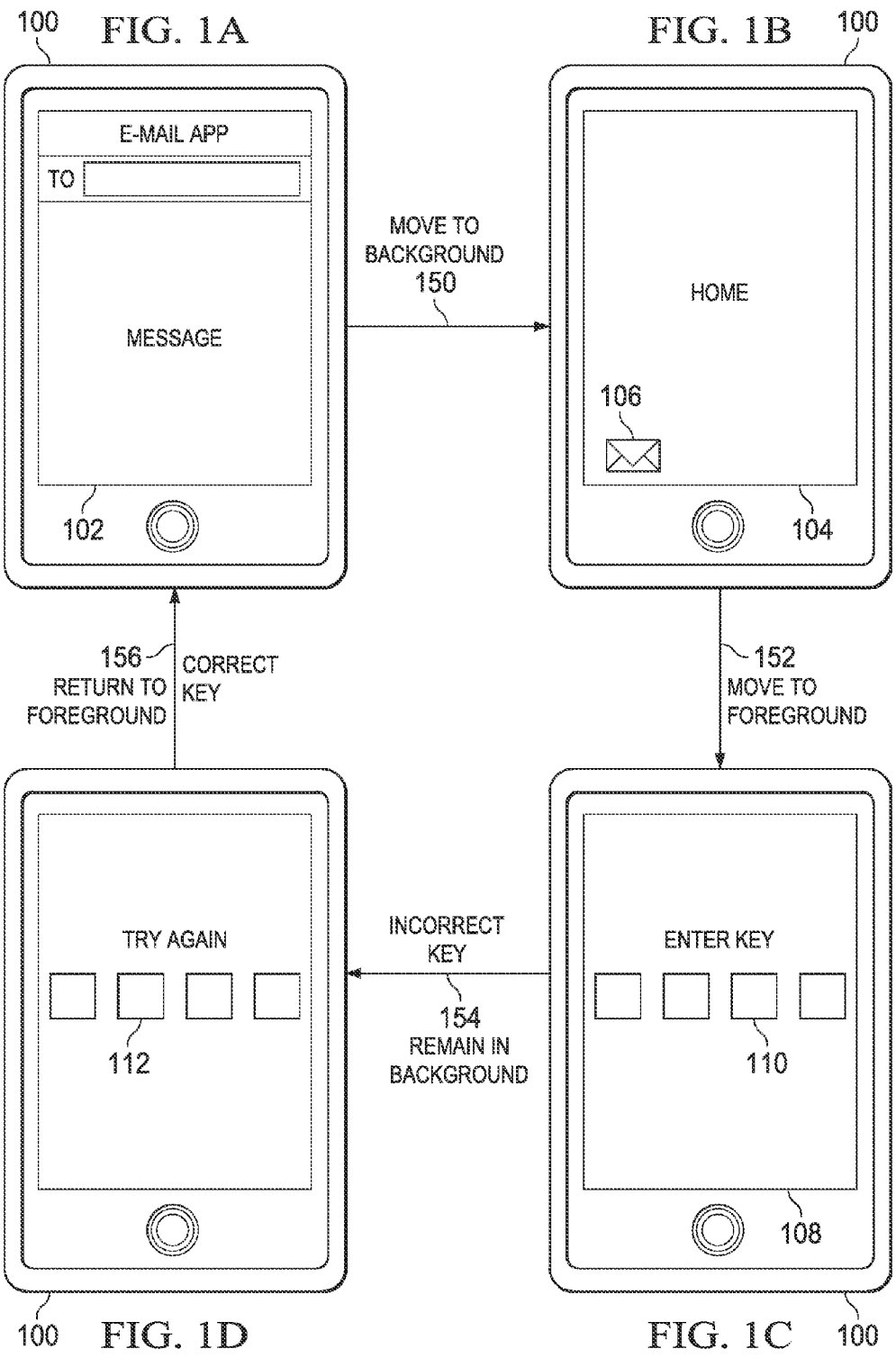
FIGS. 1A, 1B, 1C and 1D illustrate examples of a mobile device executing a computer software application executing in a foreground state and in a background state.

This disclosure generally describes computer systems, software, and computer-implemented methods to enhance useability of mobile devices that securely store data. A mobile device, as described below, can be a computer system that includes a computer-readable medium that stores computer software instructions and a data processing apparatus that executes the instructions to perform operations. The mobile device can execute one or more computer software applications, each of which is associated with respective computer software instructions. For example, multiple computer software applications can be installed on the mobile device and can be executed by the data processing apparatus of the mobile device. The mobile device can execute multiple computer software applications simultaneously. For example, the data processing apparatus of the mobile device can execute computer software instructions associated with the multiple applications in parallel. Each of the multiple applications can provide a respective user interface which the mobile device can display through which the user can interact with the respective application.

The device can execute one or more applications in either a foreground state (sometimes known as an active state) or in a background state (sometimes known as an inactive state). The device executes an application in a foreground state when the user is interacting with the application. When the device does so, the application executing in the foreground state is designated as being active. For example, the device presents a user interface associated with an application that the device is executing in the foreground state to a user of the device, such that the user can provide input and receive output through the user interface. The device executes an application in a background state when the user does not interact with the application, either because the user interface is hidden from display or because the user is not interacting with the user interface and is instead interacting with another user interface. When the device does so, the application executing in the background state is designated as being inactive.

For example, the mobile device can execute an electronic mail (e-mail) application and a bank account management application simultaneously. Each of the two applications may provide a respective user interface using which the user of the device can interact with the respective application. When the user interacts with the user interface of the e-mail application, then the e-mail application is active and is executing in the foreground state while the bank account management application is inactive and is executing in the background state. Conversely, when the user interacts with the bank account management application, the bank account management application is executing in the foreground state while the e-mail application is executing in the background state. As described below, the device can transfer an application from a foreground state to a background state and vice versa.

In some implementations, the device may display only one of the respective user interfaces in a foreground of the device at a given instant. For example, when the device executes the e-mail application and the bank account management application in a foreground state and a background state, respectively, the device displays the user interface associated with the e-mail application in a foreground of the device and hides the user interface associated with the bank account management application from display. The user can provide input to switch the e-mail application to the background state and the bank account management application to the foreground state. In response, the mobile device can hide the user interface associated with the e-mail application from display, and display the user interface associated with the bank account management application in its place in the foreground of the device. In this manner, the mobile device offers a useability whereby the user can switch between applications.

Each computer software application can be associated with data that the mobile device can store, for example, in the computer-readable medium. For example, a computer software application can be associated with persistent data that the mobile device stores for a long duration, for example, even when the mobile device is not executing the computer software application. Alternatively, or in addition, the application can be associated with transient data that the mobile device stores for a duration shorter than that of the persistent data, for example, for the duration that the mobile device is executing the application. When the device stops executing the application, then the transient data can be discarded. The application can additionally be associated with data items that the mobile device does not store.

To securely store some or all portions of the data associated with each computer software application, the mobile device can implement a data encryption/decryption mechanism. Certain data encryption/decryption mechanisms that encrypt/decrypt data associated with the application may seek input from a user. For example, the mechanism may request a password to encrypt the data resulting in encrypted data and, later, may request another password to decrypt the encrypted data. Some encryption/decryption mechanisms may implement strong password policies that call for a significant quantity of user interaction, for example, by requesting the user to provide an encryption password that is several characters long (for example, eight characters long) and by requesting the user to provide a decryption password that is also several characters long.

From the perspective of a user of a mobile device, a computer software application executing on the device has high useability if, for example, the application requests minimal user input to be transferred from the foreground state to the background state, and vice versa. For example, the device has high useability if the user can transfer an application from a foreground state to a background state using a single selection and can similarly transfer the application from the background state to a foreground state using another single selection. A data encryption/decryption mechanism, for example, one with strong password policies, offers high security if the mechanism securely stores the data regardless of the quantity of user interaction. Thus, a data encryption/decryption mechanism that securely stores data associated with a computer software application by requesting significant quantities of input from the user may negatively affect a useability of the device that executes the application and other application.

By implementing the techniques described in this disclosure, a trade-off between useability of a computer software application executing on a mobile device, and security of data associated with the application that is stored by the mobile device can be achieved. For example, the mobile device can execute the application and the data encryption/decryption mechanism to minimize a quantity of input that a user needs to provide to encrypt/decrypt the data when transfer the application from the foreground state to the background state, and vice versa, respectively, while also storing the data associated with the application as securely as possible using the input to encrypt/decrypt the data.

FIGS. 1A-1D illustrate examples of a mobile device 100 executing a computer software application executing in a foreground state and in a background state. As shown in FIG. 1A, when the mobile device 100 executes an application (for example, an e-mail application) in a foreground state, the mobile device 100 displays a user interface 102 associated with the application in the device 100. At 150, the mobile device 100 receives input (described below) to transfer the application to a background state. In response, the device 100 transfers the application to the background state, and hides the user interface 102 from display (FIG. 1B). In addition, the mobile device 100 displays another user interface 104 in place of the user interface 102. For example, the other user interface 104 can be a "Home" screen of the device 100 in which the device 100 can display an icon 106 representing the application that the device 100 has transferred to the background state. Alternatively, the other user interface can be associated with another application that the device 100 is executing in the foreground state after transferring the application to the background state.

Further, the device 100 implements a data encryption mechanism that encrypts application data, i.e., data associated with the application, and stores the encrypted data. In addition, the device 100 generates noise data, which include one or more modified copies of the application data, and encrypts each item of the noise data using the data encryption mechanism. As described below, the noise data can prevent or delay access to the application data, or obfuscate the application data (or both) if a security of the device 100, and consequently the application, data has been compromised.

At 152, the device 100 receives input (described below) to transfer the application from the background state to the foreground state. In response, the device 100 displays a user interface 108 into which the device 100 requests input to establish that an authorized user of the device 100 is seeking access to the application data (FIG. 1C). For example, a user of the device 100 can enter a key into the region 110 that the device 100 displays in the user interface 108. If the device 100 determines that the key received in the region 110 is incorrect, then at 154, the device 100 denies retains the application in the background state and denies access to the application data. In addition, the device 100 presents a notification on the user interface 112 notifying the user to enter the key again (FIG. 1D). When the device 100 receives the correct key, then at 156, the device 100 returns the application from the background state to the foreground state, thereby granting access to the application data (FIG. 1A). Techniques using which the device 100 determines if a received key is correct or not are described below. Also, as described below, if the device 100 does not receive the correct key after a threshold number of requests, then the device 100 can execute functionality that locks the device 100.

Returning to FIG. 1A, the mobile device 100 can receive the first input to transfer an application from a foreground state to a background state in one of several ways. For example, a user of the mobile device 100 can manually provide the first input. Alternatively, the user can provide input to transfer a different application to the foreground state, which the device 100 can treat as the first input. In some implementations, the first input can be automatic, i.e., received without user intervention. For example, when the mobile device 100, which can be a mobile cellular phone executing an e-mail application in the foreground state, receives an incoming phone call, then the mobile device 100 can automatically transfer the e-mail application to the background state and present a user interface associated with the telephone functionality of the device 100. In some implementations, the first input can be triggered based on time, for example, either when a time instant begins (such as an alarm application) or when a time instant expires (such as a timer application).

As described above, the mobile device 100 creates one or more items of noise data, each of which is a modified copy of the application data, in response to receiving the first input. In some implementations, the device 100 can generate the noise data by generating a copy of the application data, and modifying the copy to generate the noise data. The noise data can have a substantially similar or identical format as the application data. For example, if the application data is a date having an "MM/DD/YYYY" format, then the noise data can also have the same format. In another example, if the application data is a 5-digit number, then the noise data can also be a 5-digit number. A value of the noise data can be different from the application data. In the example of the noise data having a date format, the value of each noise data can be a respective date prior to or subsequent to the value of the application data.

In some implementations, the device 100 can generate multiple copies of the application data, each copy being the noise data. In addition, the mobile device 100 can generate one or more of the copies to have a different size (for example, file size) relative to the application data. The device 100 can execute the data encryption mechanism on the application data and each noise data. As described below, the noise data can obfuscate an identity of the application data if data security of the device 100 is compromised thereby preventing, denying, or delaying access to the application data.

The mobile device 100 can execute the data encryption mechanism on the application data using a first key. For example, the data encryption mechanism can implement a hash function on the application using the first key resulting in a first authentication code associated with the application data. The first key can be known to a user of the device 100. The data encryption mechanism can implement a password policy that does not call for a significant quantity of input from the user. For example, the data encryption mechanism can request the user to provide a four-character string or a string of fewer characters as the first key. In some implementations, the device 100 can store the first key, for example, when the application is installed on the device 100. In such situations, in response to receiving the first input, the mobile device 100 executes the data encryption mechanism on the application data of the application using the stored first key. In some implementations, the device 100 may not generate or store a key for the application. Instead, the device 100 can request the user to provide the first key, for example, in a user interface (not shown), in real time, i.e., when the user provides the first input to transfer the application to the background state.

When the mobile device 100 executes the data encryption mechanism using the first key received from the user in response to the first input, a first authentication code results. The first authentication code can be unique, i.e., a combination of the application data encrypted using the first key using the data encryption mechanism executed by the device 100 is the only combination that can result in the first authentication code. Any change to either the data or the key or the encryption mechanism will result in a code that will be different from the first authentication code. Further, only the first key can decrypt the encrypted application data to provide the application data.

Such a request by the device 100 to the user to input data when the user has provided the first input can affect a useability of the device 100 from the user's perspective. For example, the user may experience some inconvenience by having to provide a key in addition to providing the first input. To alleviate the inconvenience, the data encryption mechanism implements a password policy that requests a shorter key (for example, four characters or shorter) relative to encryption mechanisms that implement strong password policies and will request longer keys (for example, eight characters). By doing so, the device 100 can decrease a detrimental effect of executing the data encryption mechanism on the useability of the device 100, while providing a benefit of securely storing the application data.

In addition to executing the data encryption mechanism on the application data, the mobile device 100 can execute the data encryption mechanism on each of the noise data generated as described above, but using a second key that is different from the first key. By doing so, the device 100 can generate one or more second authentication codes for the respective one or more items of encrypted noise data. Each second authentication code will be unique to the respective noise data and will be different from the first authentication code. For example, because each second authentication code resulted from a combination of a respective noise data encrypted using a respective second key by the data encryption mechanism, each second authentication code is unique to the respective noise data. In some implementations, the data encryption mechanism can implement a hash function on each of the noise data without any key, resulting in a respective second authentication code. Whereas the first authentication code was generated from the first key, each second authentication code was generated without a key. In some implementations, the data encryption mechanism can modify the first key, and implement the hash function on each of the noise data using the modified first key. The second key used to encrypt all the noise data can be the same. Nevertheless, because each noise data is different from each other noise data, the resulting second authentication code will be unique. Alternatively, each noise data can be encrypted using a respective second key. The device 100 may not provide the key with which the noise data is encrypted to the user.

Encrypting the items of data that include the application data and the noise data as described above can provide multiple layers of data security to the application data. To access the encrypted application data, a user of the device 100 needs to provide the first key that resulted in the first authentication code. Failure to do so will result in the device 100 denying access to the application data, and, after a threshold number of failed attempts, denying access to the device entirely. If an unauthorized user is able to access the encrypted items of data, i.e., the encrypted application data and the encrypted noise data, the unauthorized user will not immediately know and will have difficulty determining the identity of the encrypted application data from among the items of encrypted data. Moreover, if the unauthorized user is able to over-ride the data encryption/decryption mechanism and access the items of data, the unauthorized user will nevertheless not immediately know the identity of the application data because the items of noise data have the same format and are variants of the application data.

The mobile device 100 can store the first authentication code, each of the one or more second authentication codes, the items of data, and the items of encrypted data, for example, in a computer-readable storage medium associated with the device 100. The computer-readable storage medium can be local to (for example, incorporated in) the device 100, or, alternatively, can be remotely connected to the device 100, for example, over a network such as the Internet. In some implementations, the device 100 may not store any information using which the application data can be differentiated from the noise data.

As described with reference to FIG. 1B, in addition to encrypting the application data and the noise data, the mobile device 100 transfers the application from the foreground state to the background state, and renders the application inactive in response to receiving the first input. Subsequently, the device 100 receives a second input to transfer the application from the background state to the foreground state. The second input is also an input requesting the application data. In response to receiving the second input, the device 100 requests a key, for example, through the user interface 108 (FIG. 1D), as described above. The device 100 receives the key and executes the encryption mechanism on all items of data associated with the application data using the received key resulting in an authentication code for each item of data associated with the application.

If the key that the mobile device 100 receives after the device 100 receives the second input is the first key using which the data encryption mechanism encrypted the application data, then the authentication code will result when at least one item of data is encrypted using the received key. In contrast, if the key is not the first key, then the authentication code will not result for any item of data encrypted using the received key. For example, if the key is not the first key and the item of data is the application data or a noise data, then the resulting authentication code will not be the first authentication code. Further, unless the encrypted item of data is the application data, the resulting authentication code will not be first authentication code regardless of the key. For example, if the key is the first key and the item of data is a noise data, then the resulting authentication code will not be the first authentication code. Also, if the key is not the first key and the item of data is a noise data, then too the resulting authentication code will not be the first authentication code.

The device 100 executes the encryption mechanism on each item of data associated with the application, and compares each resulting code with the first authentication code. If the device 100 determines a match, then the device 100 determines that the encrypted item of data is the application data and transfers the application from the background state to the foreground state.

In some implementations, the mobile device 100 executes a decryption mechanism on each item of encrypted data to identify the application data. For example, the device 100 decrypts an item of encrypted data using the received key and an authentication code, which was determined for the item of encrypted data when the item was encrypted. If the key is the first key and the authentication code is the first authentication code, only then will the decrypted item of encrypted data be the application data. If, on the other hand, the key is not the first key, then the item of encrypted application data cannot be decrypted. Further, if the key is not the first key, then too the item of encrypted application data cannot be decrypted. Also, decrypting an item of encrypted noise data will not result in the application data regardless of the key.

In some implementations, once the device 100 has identified the application data by implementing the techniques described above, the device 100 can discard all other data as noise data. Alternatively, or in addition, the device 100 can encrypt each of the remaining items of data using the key received when the second input is received resulting in an authentication code. For each remaining item, the device 100 can determine that the authentication code is not the first authentication code, and determine that the data that was encrypted is not the application data. Accordingly, the device 100 can determine that the encrypted data is noise data and discard the data. Discarding the data can include deleting the data from storage, and hiding, i.e., not providing, the data in response to the second input to transfer the application from the background state to the foreground state.

Further, if the device 100 determines that an authentication code that results when an item of data is encrypted using the received key is not the first key, then the device 100 determines that the encrypted item of data is not the application data. In response, the device 100 denies access to the application data. For example, the device 100 can provide an indication that the received key is incorrect (FIG. 1D) and request the key again. Alternatively, or in addition, the device can lock the device 100.

By implementing the techniques described above, the device 100 can implement a data encryption mechanism that provides security to application data that the device 100 transfers from the foreground state to a background state, and vice versa, while decreasing a detrimental effect of executing the data encryption mechanism on useability of the device 100. In some implementations, the device 100 may not store any information using which an unauthorized user can differentiate between the application data and the noise data when the application is in the background state and the application data and the noise data have been encrypted, as doing so may enable the unauthorized user to identify the application data using the information. Further, if the unauthorized user is able to over-ride the data encryption mechanism and obtain access to the application data and the noise data, the similarity between the two data will obfuscate the identity of the application data, thereby rendering a difficult for the unauthorized user to access the application data.

Figure 2:
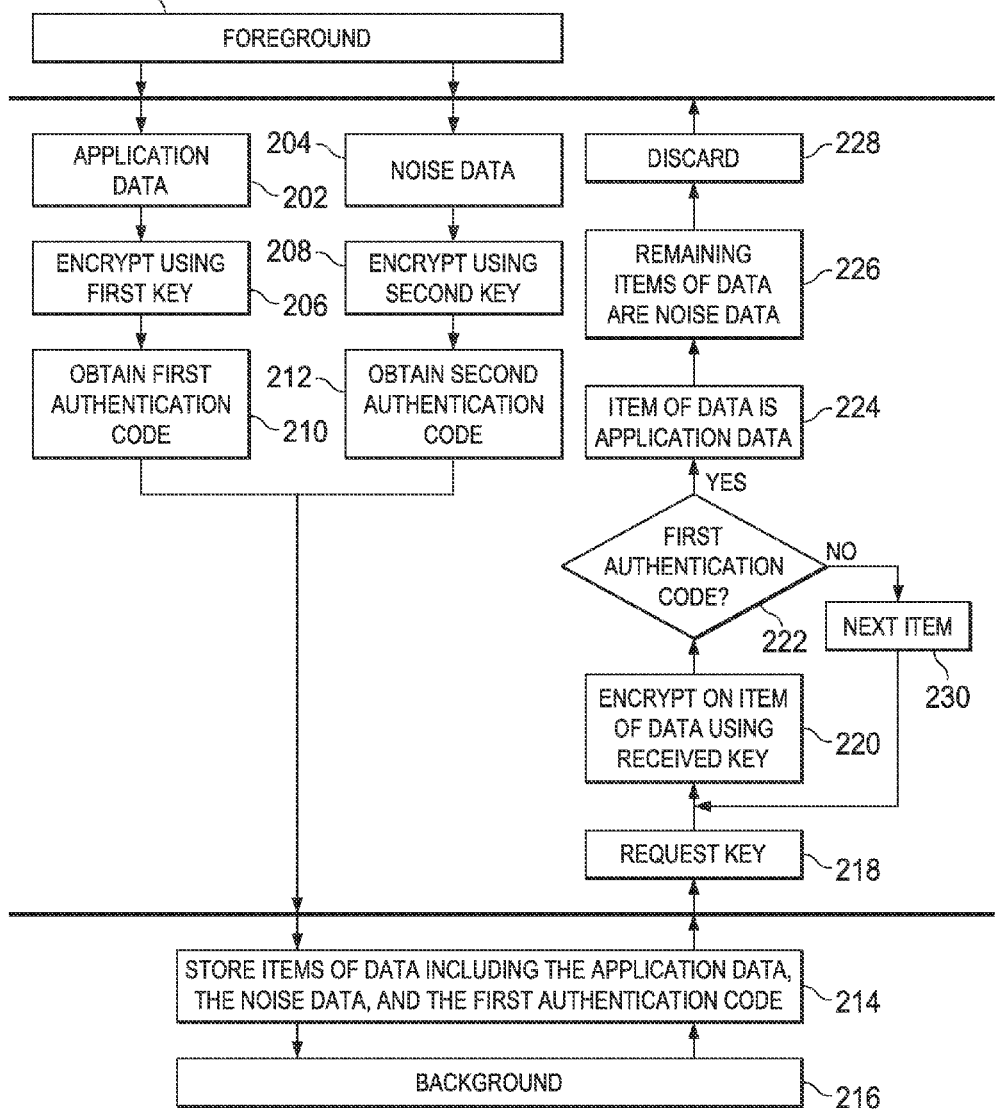
FIG. 2 illustrates an example of a mobile device encrypting data associated with a computer software application transferred to a foreground state to a background state, and decrypting the data when the application is transferred to the foreground state.

FIG. 2 illustrates an example of a mobile device, for example, the mobile device 100, encrypting data associated with a computer software application transferred to a foreground state to a background state, and decrypting the data when the application is transferred to the foreground state. At 200, the mobile device is executing a computer software application in the foreground. The application is associated with application data including persistent data and transient data. The techniques to encrypt data described with reference to FIG. 2 can be implemented on the transient data. The persistent data and other data associated with the application that is more important than the transient data can be encrypted using encryption mechanisms that implement strong password policies.

Upon receiving the input to transfer the application from the foreground state to the background state, the device identifies application data at 202 and generates noise data at 204. The device can generate the noise data from the application data. The noise data can be meaningful data that can render differentiating between the noise data and the application data difficult for an entity not authorized to access the application data. Because the noise data obfuscates the identity of the real data, a data encryption mechanism that implements short password policies can be used to encrypt/decrypt the application and noise data. In some implementations, the device can generate many items of noise data—for example, four items—for each application data. In some implementations, the device can perform arithmetic and logical operations on the application data to generate the noise data. For example, if the application data is a particular number (for example, a salary), then the device can generate multiple items of noise data, each of which is a number that is greater than or less than the particular number. An example of application data is shown in Table 1 and examples of noise data generated from the example application data are shown in Table 2 below.

TABLE 1

Example Application Data

| Application Data | (table:employee,23/12/2010, 532105) |

TABLE 2

Example Noise Data

| Noise Data 1 | (table:employee,23/12/2010, 532105) |
| Noise Data 2 | (table:employee,19/12/2010, 702770) |
| Noise Data 3 | (table:employee,25/12/2010, 782290) |
| Noise Data 4 | (table:employee,27/12/2010, 891231) |

The dates in each example noise data is a variant of the date in the example application data. Further, the employee number in each example noise data is a variant of the employee number in the example application data.

At 206, the device encrypts the application data using a first key received, for example, through a user interface. In some implementations, the device can generate and provide the first key to the user without user input. Alternatively, the user can provide a key which the device can use as the first key. The device can implement the data encryption mechanism to encrypt the application data using the received first key. To encrypt the application data, the device can implement a cryptographic hash function, for example, the MD6 Message-Digest Algorithm that uses a Merkle tree-like structure to allow for parallel computation of hashes. By processing the combination of the application data and the first key, the data encryption mechanism can return a first authentication code, for example, a fixed-size bit string such that an accidental or intentional change to the data or to the first key will result in a code that is not the first authentication code. In this manner, the device can obtain the first authentication code at 210.

At 208, the device can encrypt the noise data using a second key that is different from the first key. For example, the device can implement the data encryption mechanism to encrypt the application data without any key. Alternatively, the second key can be a variant of the first key. At 212, the device can obtain a second authentication code which will be different from the first authentication code. At 214, the device can store the items of data including the application data and the noise data, and the respective authentication codes and, at 216, transfer the application to the background state in response to the input received at 200. In addition, the device can also store the items of encrypted data.

When the device receives a second input to transfer the application from the background state to the foreground state, the device can request a key at 218. As described above, the device may not store information that distinguishes the application data from the noise data. Instead, the device can store all the data associated with the application. At 220, the device can encrypt an item of stored data that is associated with the application. At 222, the device can check if the code that results from the encryption of an item of data at 220 is the first authentication code. If the device determines that the code is the first authentication code (decision branch "Yes"), then, at 224, the device can determine that the item of data is the application data, and transfer the application to the foreground state such that the application data can be accessed. The device can then determine that the remaining items of data are noise data (at 226) and discard the noise data (at 228). If the device determines that the code obtained at 220 is not the first authentication code (decision branch "No"), then the device can determine that the item of data is not the application, and may not transfer the application to the foreground state. Instead, the device can identify the next stored item at 230 and repeat the encryption step 222. If the device determines that none of the items of data are the application data, then the device can once again request the key.

Figure 3:
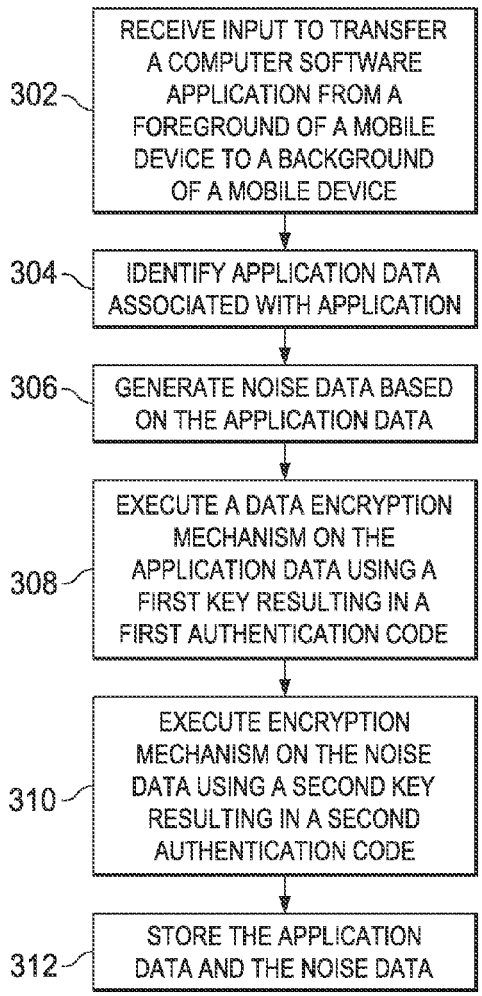
FIG. 3 is a flowchart of an example process by which a mobile device encrypts data associated with a computer software application.

FIG. 3 is a flowchart of an example process 300 by which a mobile device encrypts data associated with a computer software application. The process 300 can be implemented by a computer-readable medium storing computer program instructions executable by data processing apparatus in a computer system, for example, the mobile device 100. At 302, the mobile device receives a first input to transfer a computer software application executing on a mobile device from a foreground state of the mobile device to a background state of the mobile device. At 304, the mobile device identifies application data associated with the application. At 306, the mobile device generates noise data based on the application data. At 308, the mobile device executes a data encryption mechanism on the application data using a first key resulting in a first authentication code. At 310, the mobile device executes an encryption mechanism on the noise data using a second key resulting in a second authentication code. At 312, the mobile device stores the application data and the noise data.

Figure 4:
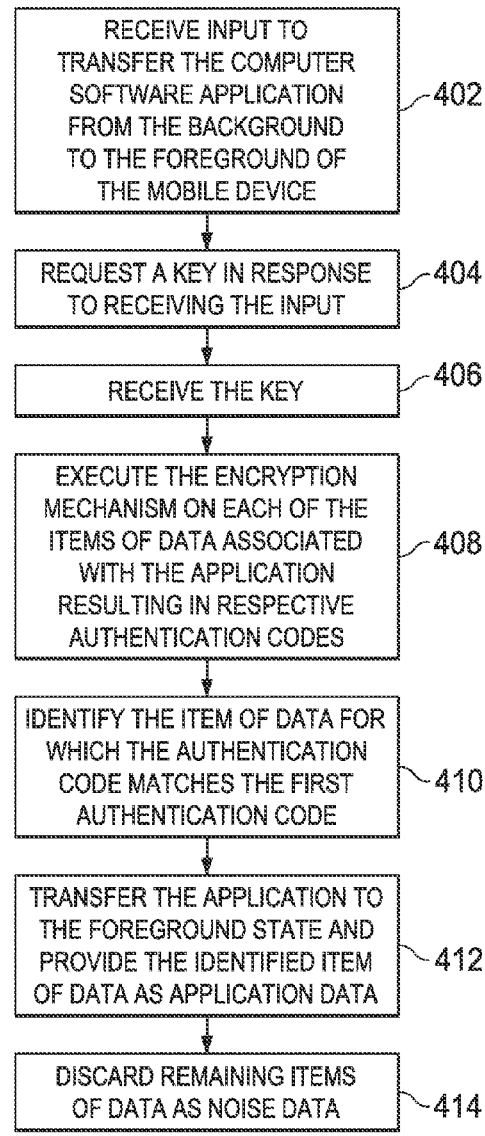
FIG. 4 is a flowchart of an example process by which the mobile device of FIG. 3 decrypts data associated with the computer software application.

FIG. 4 is a flowchart of an example process 400 by which the mobile device of FIG. 3 decrypts data associated with the computer software application. The process 400 can be implemented by a computer-readable medium storing computer program instructions executable by data processing apparatus in a computer system, for example, the mobile device 100. At 402, the mobile device receives input to transfer the computer software application from the background to the foreground of the mobile device. At 404, the mobile device requests a key in response to receiving the input. At 406, the mobile device receives the key. At 408, the mobile device executes the encryption mechanism on each item of data associated with the application resulting in respective authentication codes. At 410, the mobile device identifies the item of data for which the authentication code matches the first authentication code obtained at 308 in process 300 described above. At 412, the mobile device transfers the application to the foreground state and provides the item of data identified at 410 as the application data. At 414, the mobile device discards the remaining items of data as noise data.

The techniques described above pertain to implementations in which the device executes a particular application in the foreground state by displaying only the user interface associated the particular application in the foreground state, and executes the particular application in the background state by hiding the user interface associated with the particular application from display. However, in some implementations, the device can display user interfaces of multiple applications simultaneously. Of the multiple applications, one or more applications with which the user is interacting are executing in the foreground state while the remaining one or more applications with which the user is not interacting are executing in the background state. Thus, applications executing in the background state can be associated with user interfaces that the device may or may not display.

Moreover, in a default situation, for example, when the mobile device is powered on, a default user interface that the mobile device presents (for example, a "Home" screen" is executing in the foreground state. Also, if the user is not interacting with any application at a given time, then the user interface of the last application with which the user interacted is determined as executing in the foreground state while all other applications that the device is executing are determined as executing in the background state.

In some implementations, the techniques described here can be implemented with portions of data associated with a computer software application. For example, a computer software application can be associated with persistent data and transient data, as described above. The techniques described here can be implemented for transient data so that a user of the application can provide shorter passwords to encrypt/decrypt the transient data. In some implementations, the mobile device can implement encryption/decryption mechanisms with strong password policies for the persistent data regardless of the effect of doing so on the useability of the application from the perspective of the user of the mobile device.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus, such as, for example, data processing apparatus 110, data processing apparatus 114. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium, such as, for example, computer-readable medium 112, computer-readable medium 116, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (e.g., multiple CDs, disks, or other storage devices).

The operations described in this specification can be implemented as operations performed by a data processing apparatus on resource stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
    receiving a first input to transfer a computer software application executing on a mobile device from a foreground state of the mobile device to a background state of the mobile device, wherein the computer software application is associated with application data; and
    in response to receiving the first input:
        generating noise data based on the application data,
        executing an encryption mechanism on the application data using a first key resulting in a first authentication code associated with the application data,
        executing the encryption mechanism on the noise data using a second key that is different from the first key resulting in a second authentication code associated with the noise data, and
        storing items of data including the application data, the noise data, and the first authentication code.

2. The method of claim 1, further comprising:
    receiving a second input to transfer the computer software application from the background state to the foreground state; and
    in response to receiving the second input:
        requesting a key,
        receiving the key, and
        executing the encryption mechanism on a stored item of data using the received key resulting in a code.

3. The method of claim 2, wherein, if the key is the first key, then the code is the first authentication code, the method further comprising, in response to executing the encryption mechanism on a stored item of data using the received key resulting in the code:
    determining that the code is the first authentication code;
    determining that the stored item of data is the application data;
    transferring the computer software application from the background state to the foreground state; and
    discarding remaining stored items of data other than the application data.

4. The method of claim 2, wherein, if the key is not the first key, then the code is not the first authentication code, the method further comprising, in response to executing the encryption mechanism on a stored item of data using the received key resulting in the code:
    determining that the code is not the first authentication code;
    determining that the stored item of data is not the application data;
    denying access to the application data by providing an indication that the received key is incorrect, and requesting the key again.

5. The method of claim 4, further comprising locking the mobile device if the key is not the first key.

6. The method of claim 2, wherein, if the key is the first key, then the code is not the second authentication code, the method further comprising, in response to executing the encryption mechanism on a stored item of data using the received key resulting in the code:
    determining that the code is not the second authentication code;
    determining that the stored item of data is the noise data; and
    in response to determining that the stored item of data is the noise data, hiding the noise data by deleting the noise data from the mobile device.

7. The method of claim 1, wherein generating the noise data based on the application data comprises:
    generating a copy of the application data; and
    modifying the copy of the application data to generate the noise data.

8. The method of claim 1, wherein the computer software application presents a user interface when executing in the foreground state and hides the user interface from display when executing in the background state.

9. A non-transitory computer-readable medium tangibly encoding computer program instructions executable by a data processing apparatus to perform operations comprising:
    receiving a first input to transfer a computer software application executing on a mobile device from a foreground state of the mobile device to a background state of the mobile device, wherein the computer software application is associated with application data; and
    in response to receiving the first input:
        generating noise data based on the application data,
        executing an encryption mechanism on the application data using a first key resulting in a first authentication code associated with the application data,
        executing the encryption mechanism on the noise data using a second key that is different from the first key resulting in a second authentication code associated with the noise data, and
        storing items of data including the application data, the noise data, and the first authentication code.

10. The medium of claim 9, wherein the operations further comprise:
    receiving a second input to transfer the computer software application from the background state to the foreground state; and
    in response to receiving the second input:
        requesting a key,
        receiving the key, and
        executing the encryption mechanism on a stored item of data using the received key resulting in a code.

11. The medium of claim 10, wherein, if the key is the first key, then the code is the first authentication code, the operations further comprising, in response to executing the encryption mechanism on a stored item of data using the received key resulting in the code:
    determining that the code is the first authentication code;
    determining that the stored item of data is the application data;
    transferring the computer software application from the background state to the foreground state; and
    discarding remaining stored items of data other than the application data.

12. The medium of claim 10, wherein, if the key is not the first key, then the code is not the first authentication code, the operations further comprising, in response to executing the encryption mechanism on a stored item of data using the received key resulting in the code:
   determining that the code is not the first authentication code;
   determining that the stored item of data is not the application data;
   denying access to the application data by providing an indication that the received key is incorrect, and requesting the key again.

13. The medium of claim 12, the operations further comprising locking the mobile device if the key is not the first key.

14. The medium of claim 10, wherein, if the key is the first key, then the code is not the second authentication code, the operations further comprising, in response to executing the encryption mechanism on a stored item of data using the received key resulting in the code:
   determining that the code is not the second authentication code;
   determining that the stored item of data is the noise data; and
   in response to determining that the stored item of data is the noise data, hiding the noise data by deleting the noise data from the mobile device.

15. The medium of claim 9, wherein generating the noise data based on the application data comprises:
   generating a copy of the application data; and
   modifying the copy of the application data to generate the noise data.

16. The medium of claim 9, wherein the computer software application presents a user interface when executing in the foreground state and hides the user interface from display when executing in the background state.

17. A system comprising:
   a data processing apparatus; and
   a non-transitory computer-readable medium tangibly encoding computer program instructions executable by the data processing apparatus to perform operations comprising:
      receiving a first input to transfer a computer software application executing on a mobile device from a foreground state of the mobile device to a background state of the mobile device, wherein the computer software application is associated with application data; and
      in response to receiving the first input:
         generating noise data based on the application data,
         executing an encryption mechanism on the application data using a first key resulting in a first authentication code associated with the application data,
         executing the encryption mechanism on the noise data using a second key that is different from the first key resulting in a second authentication code associated with the noise data, and
         storing items of data including the application data, the noise data, and the first authentication code.

18. The system of claim 17, wherein the operations further comprise:
   receiving a second input to transfer the computer software application from the background state to the foreground state; and
   in response to receiving the second input:
      requesting a key,
      receiving the key, and
      executing the encryption mechanism on a stored item of data using the received key resulting in a code.

19. The system of claim 18, wherein, if the key is the first key, then the code is the first authentication code, the operations further comprising, in response to executing the encryption mechanism on a stored item of data using the received key resulting in the code:
   determining that the code is the first authentication code;
   determining that the stored item of data is the application data;
   transferring the computer software application from the background state to the foreground state; and
   discarding remaining stored items of data other than the application data.

20. The system of claim 18, wherein, if the key is not the first key, then the code is not the first authentication code, the operations further comprising, in response to executing the encryption mechanism on a stored item of data using the received key resulting in the code:
   determining that the code is not the first authentication code;
   determining that the stored item of data is not the application data;
   denying access to the application data by providing an indication that the received key is incorrect, and requesting the key again.

21. The system of claim 20, the operations further comprising locking the mobile device if the key is not the first key.

22. The system of claim 18, wherein, if the key is the first key, then the code is not the second authentication code, the operations further comprising, in response to executing the encryption mechanism on a stored item of data using the received key resulting in the code:
   determining that the code is not the second authentication code;
   determining that the stored item of data is the noise data; and
   in response to determining that the stored item of data is the noise data, hiding the noise data by deleting the noise data from the mobile device.

23. The system of claim 17, wherein generating the noise data based on the application data comprises:
   generating a copy of the application data; and
   modifying the copy of the application data to generate the noise data.

24. The system of claim 17, wherein the computer software application presents a user interface when executing in the foreground state and hides the user interface from display when executing in the background state.

* * * * *